US012211049B2

(12) United States Patent
He et al.

(10) Patent No.: US 12,211,049 B2
(45) Date of Patent: Jan. 28, 2025

(54) SYSTEMS AND METHODS FOR DETERMINING THE HEALTH OF SOCIAL TOKENS

(71) Applicant: Early Warning Services, LLC, Scottsdale, AZ (US)

(72) Inventors: Jie He, Naperville, IL (US); Laura Weinflash, Scottsdale, AZ (US); Matt Work, Hilliard, OH (US)

(73) Assignee: Early Warning Services, LLC, Scottsdale, AZ (US)

( * ) Notice: Subject to any disclaimer, the term of this patent is extended or adjusted under 35 U.S.C. 154(b) by 401 days.

(21) Appl. No.: 17/478,725

(22) Filed: Sep. 17, 2021

(65) Prior Publication Data

US 2022/0084036 A1    Mar. 17, 2022

Related U.S. Application Data

(60) Provisional application No. 63/192,979, filed on May 25, 2021, provisional application No. 63/079,859, filed on Sep. 17, 2020.

(51) Int. Cl.
*G06Q 20/40*    (2012.01)
(52) U.S. Cl.
CPC ....... *G06Q 20/4016* (2013.01); *G06Q 20/405* (2013.01); *G06Q 20/407* (2013.01)
(58) Field of Classification Search
CPC ............ G06Q 20/4016; G06Q 20/405; G06Q 20/407; G06Q 20/0457; G06Q 20/3821; G06Q 20/384
See application file for complete search history.

(56) References Cited

U.S. PATENT DOCUMENTS

| | | | |
|---|---|---|---|
| 10,990,936 B1 * | 4/2021 | Hecht | G06Q 20/102 |
| 11,410,230 B1 * | 8/2022 | Olson | G06F 21/6245 |
| 11,810,105 B2 * | 11/2023 | Vyas | G06Q 20/3672 |
| 2009/0319414 A1 * | 12/2009 | DeBie | G06Q 20/102 |
| | | | 705/35 |

(Continued)

*Primary Examiner* — Radu Andrei
*Assistant Examiner* — Vincent I Idiake
(74) *Attorney, Agent, or Firm* — Kilpatrick Townsend & Stockton LLP

(57) ABSTRACT

Systems and methods are disclosed in assessing and determining the health of social tokens associated with certain events. More specifically, but not by way of limitation, this disclosure relates to determining dynamic scores associated with social tokens for senders and receivers in those events and using those scores to assess whether to allow or reject the event. An example embodiment may include receiving data associated with a sender including a social token associated with the sender, receiving account data associated with a plurality of accounts maintained at the entities, generating a health score for the social token associated with the sender, receiving data associated with an event initiated by the sender using the P2P account associated with the sender, generating a health score for the social token associated with the receiver, determining a health score for the event, determining that the event should be approved or declined based on the health score for the event, and if declined locking the application at the network device associated with the sender.

20 Claims, 7 Drawing Sheets

(56) References Cited

U.S. PATENT DOCUMENTS

| | | | |
|---|---|---|---|
| 2013/0238491 A1* | 9/2013 | Bouey | G06Q 20/405 |
| | | | 705/39 |
| 2015/0205894 A1* | 7/2015 | Faris | G06Q 30/0641 |
| | | | 703/21 |
| 2016/0267588 A1* | 9/2016 | Cain | G06Q 40/03 |
| 2018/0336553 A1* | 11/2018 | Brudnicki | G06Q 20/3227 |
| 2021/0073768 A1* | 3/2021 | Gordon | G06Q 20/202 |
| 2023/0132878 A1* | 5/2023 | Perez | G06Q 10/067 |
| | | | 705/7.33 |
| 2023/0353530 A1* | 11/2023 | Schmid | G06Q 50/01 |

* cited by examiner

600

```
┌─────────────────────────────────────────────────────────────────────────┐
│ RECEIVING DATA ASSOCIATED WITH A PAYER INCLUDING A SOCIAL TOKEN ASSOCIATED │
│                            WITH THE PAYER                                │
│                                 602                                      │
└─────────────────────────────────────────────────────────────────────────┘
                                    ▼
┌─────────────────────────────────────────────────────────────────────────┐
│  RECEIVING ACCOUNT DATA ASSOCIATED WITH A PLURALITY OF ACCOUNTS MAINTAINED │
│                            AT THE ENTITIES                               │
│                                 604                                      │
└─────────────────────────────────────────────────────────────────────────┘
                                    ▼
┌─────────────────────────────────────────────────────────────────────────┐
│       GENERATING A HEALTH SCORE FOR THE SOCIAL TOKEN ASSOCIATED WITH THE PAYER │
│                                 606                                      │
└─────────────────────────────────────────────────────────────────────────┘
                                    ▼
┌─────────────────────────────────────────────────────────────────────────┐
│ RECEIVING DATA ASSOCIATED WITH A TRANSACTION INITIATED BY THE PAYER USING THE │
│                   P2P ACCOUNT ASSOCIATED WITH THE PAYER                  │
│                                 608                                      │
└─────────────────────────────────────────────────────────────────────────┘
                                    ▼
┌─────────────────────────────────────────────────────────────────────────┐
│       GENERATING A HEALTH SCORE FOR THE SOCIAL TOKEN ASSOCIATED WITH THE PAYEE │
│                                 610                                      │
└─────────────────────────────────────────────────────────────────────────┘
                                    ▼
┌─────────────────────────────────────────────────────────────────────────┐
│              DETERMINING A HEALTH SCORE FOR THE TRANSACTION              │
│                                 612                                      │
└─────────────────────────────────────────────────────────────────────────┘
                                    ▼
┌─────────────────────────────────────────────────────────────────────────┐
│ DETERMINING THAT THE TRANSACTION SHOULD BE DECLINED BASED ON THE HEALTH  │
│                         SCORE FOR THE TRANSACTION                        │
│                                 614                                      │
└─────────────────────────────────────────────────────────────────────────┘
                                    ▼
┌─────────────────────────────────────────────────────────────────────────┐
│       LOCKING AN APPLICATION AT A NETWORK DEVICE ASSOCIATED WITH THE PAYER │
│                                 616                                      │
└─────────────────────────────────────────────────────────────────────────┘
```

FIG. 6

SYSTEMS AND METHODS FOR DETERMINING THE HEALTH OF SOCIAL TOKENS

CROSS-REFERENCES TO RELATED APPLICATIONS

This application claims the benefit of priority to U.S. Provisional Patent Application No. 63/079,859 filed Sep. 17, 2020, entitled "SYSTEMS AND METHODS FOR DETERMINING TRANSACTION RISK USING HEALTH OF SOCIAL TOKENS," and claims the benefit of priority to U.S. Provisional Patent Application No. 63/192,979 filed May 25, 2021, entitled "FRAUD DETECTION SYSTEMS AND METHODS," the contents of which are herein incorporated in their entirety.

TECHNICAL FIELD

This disclosure generally relates to systems and methods in assessing and determining the health of social tokens associated with certain events. More specifically, but not by way of limitation, this disclosure relates to determining dynamic scores associated with social tokens for senders and receivers in those events and using those scores to assess whether to allow or reject the event.

BACKGROUND

Organizations are susceptible to fraud, mistake transactions, and other transaction issues and therefore seek to more efficiently and effectively assess transaction risk prior to completing the transaction. Transactions that are susceptible to fraud include paper checks, ACH and other electronic credits/debits to bank accounts, wire transfers from one account to another, and person-to-person (P2P) payments, among others.

Some systems for detecting suspicious events look at only one party (e.g., sender or receiver) and/or may only analyze a fraction of the available data associated with the event. For example, it has been difficult for organizations to conduct a comprehensive analysis of both sides of an event. This problem may be particularly difficult in the case of a person-to-person event or similar electronic transfers (e.g., person to small or large business, business to customer, customer to business, etc.), where an organization may receive authorization from an account holder to withdraw from a sender account at the organization and send the money to an event (e.g., P2P) system, where it is then forwarded to a receiver. An organization in that situation may have little information on the ultimate receiver, and may rely mostly or solely on the authorization by the sender to confirm identity and risk associated with the receiver. The system may have information on the sender by virtue of a user account set up with the system, including, for example, personal information on the sender, including accounts from which transfers are to be initiated. However, unless the receiver also has an account with the same system, the system may have no information on the receiver other than what it received from the sender.

Systems having more comprehensive evaluation of available data, including social data, associated with both parties to a transaction is necessary.

SUMMARY

This disclosure generally relates to systems and methods in assessing and determining the health of social tokens associated with certain events. More specifically, but not by way of limitation, this disclosure relates to determining dynamic scores associated with social tokens for senders and receivers in those events and using those scores to assess whether to allow or reject the event.

Some embodiments of the present technology include a system for determining the health of social tokens. The system may include a processing unit comprising one or more processors, and memory coupled with and readable by the processing unit and storing therein a set of instruction. When executed by the processing unit, the processing unit may cause the system to perform operations including, for example: receiving, by a processor of a data assessment system, data associated with a sender including a social token associated with the sender, wherein the data associated with the sender is used by the data assessment system to generate an account associated with the sender; receiving, by the processor of the data assessment system, from a plurality of entities, account data associated with a plurality of accounts maintained at the entities, wherein the account data includes at least data pertaining to events conducted against each of the plurality of accounts; generating, by the data assessment system, a health score for the social token associated with the sender, wherein generating the health score for the social token associated with the sender includes analyzing data associated with the sender, data associated with the social token associated with the sender, and account data received from the plurality of entities; receiving, from the sender at an application displayed on a graphical user interface (GUI) of a network device associated with the sender, data associated with an event initiated by the sender using the account associated with the sender, wherein the data associated with the event initiated by the sender includes at least a social token associated with a receiver of the event; generating, by the data assessment system, a health score for the social token associated with the receiver, wherein generating the health score for the social token associated with the receiver includes analyzing data associated with the receiver, data associated with the social token associated with the receiver, and account data received from the plurality of entities; determining, by the data assessment system and using the health score for the social token associated with the sender and the health score for the social token associated with the receiver, a health score for the event; determining, by the data assessment system, that the event should be rejected based on the health score for the event; and based on determining that the event should be rejected and at least a portion of the received account data associated with the plurality of accounts maintained at the entities, locking the application at the network device associated with the sender Some embodiments of the present technology may include a computer-implemented method. The method may include, for example, receiving, by a processor of a data assessment system, data associated with a sender including a social token associated with the sender, wherein the data associated with the sender is used by the data assessment system to generate an account associated with the sender; receiving, by the processor of the data assessment system, from a plurality of entities, account data associated with a plurality of accounts maintained at the entities, wherein the account data includes at least data pertaining to events conducted against each of the plurality of accounts; generating, by the data assessment system, a health score for the social token associated with the sender, wherein generating the health score for the social token associated with the sender includes analyzing data associated with the sender, data associated with the social token associated with the sender, and account data received from the plurality of entities; receiving, from the sender at an application displayed on a graphical user interface (GUI) of a network device associated with the sender, data associated with an event initiated by the sender using the account associated with the sender, wherein the data associated with the event initiated by the sender includes at least a social token associated with a receiver of the event; generating, by the data assessment system, a health score for the social token associated with the receiver, wherein generating the health score for the social token associated with the receiver includes analyzing data associated with the receiver, data associated with the social token associated with the receiver, and account data received from the plurality of entities; determining, by the data assessment system and using the health score for the social token associated with the sender and the health score for the social token associated with the receiver, a health score for the event; determining, by the data assessment system, that the event should be rejected based on the health score for the event.

Some embodiments of the present technology may include a non-transitory computer-readable medium storing instructions. When executed by one or more processing devices, the instructions may cause the one or more processing devices to perform operations. The embodiments may include a computer-program product tangibly embodied in a non-transitory machine-readable storage medium, including instructions configured to cause one or more data processors to perform operations comprising. The operations may include, for example, receiving, by a processor of a data assessment system, data associated with a sender including a social token associated with the sender, wherein the data associated with the sender is used by the data assessment system to generate an account associated with the sender; receiving, by the processor of the data assessment system, from a plurality of entities, account data associated with a plurality of accounts maintained at the entities, wherein the account data includes at least data pertaining to events conducted against each of the plurality of accounts; generating, by the data assessment system, a health score for the social token associated with the sender, wherein generating the health score for the social token associated with the sender includes analyzing data associated with the sender, data associated with the social token associated with the sender, and account data received from the plurality of entities; receiving, from the sender at an application displayed on a graphical user interface (GUI) of a network device associated with the sender, data associated with an event initiated by the sender using the account associated with the sender, wherein the data associated with the event initiated by the sender includes at least a social token associated with a receiver of the event; generating, by the data assessment system, a health score for the social token associated with the receiver, wherein generating the health score for the social token associated with the receiver includes analyzing data associated with the receiver, data associated with the social token associated with the receiver, and account data received from the plurality of entities; determining, by the data assessment system and using the health score for the social token associated with the sender and the health score for the social token associated with the receiver, a health score for the event; determining, by the data assessment system, that the event should be rejected based on the health score for the event.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 6 illustrates a flow chart including a method directed to assessing risk associated with an event using social tokens, according to embodiments of the present technology.

DETAILED DESCRIPTION

Figure 1:
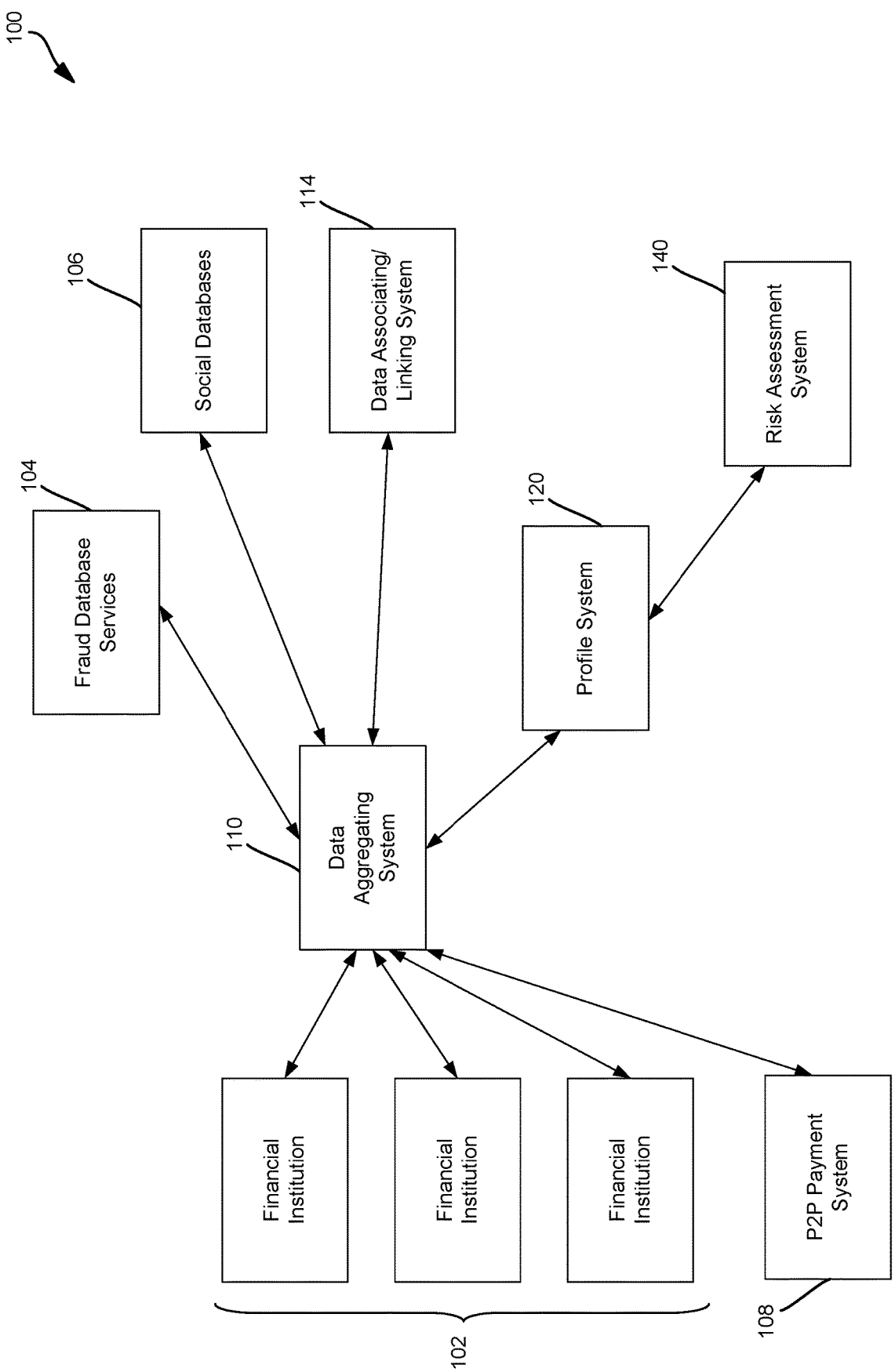
FIG. 1 illustrates a block diagram representing an event system, according to embodiments of the present technology.

This disclosure generally relates to systems and methods in assessing and determining the health of social tokens associated with certain events. More specifically, but not by way of limitation, this disclosure relates to determining dynamic scores associated with social tokens for senders and receivers in those events and using those scores to assess whether to allow or reject the event.

This disclosure is directed to methods and systems that have more comprehensive evaluation of available data, including social data, associated with both parties to an event (e.g., a transaction), as compared to previously disclosed systems and methods. The event/data assessment systems described herein are directed to analyzing the health of social tokens based on data collected over a period of time. The event assessment systems analyze the aggregated data to generate one or more scores associated with a social token. The scores may include a score associated with the social token in general, and may include additional scores directed to certain aspects or characteristics associated with the social token, such as a score directed to when the social token is used by its owner as a payee (i.e. a receiver) in transactions (e.g., financial transactions), a score directed to when the social token is used by its owner as a payer (i.e. a sender) in events, or a score directed to a specific combination of parties in transactions.

The data used to determine health scores associated with a social token may come from a variety of different sources, and may include a variety of different types of information. Because the event assessment systems use all different types of data at their disposal to provide a well-rounded and holistic analysis of a social token, and at the same time provide simple and easy-to-use resulting health scores associated with the social token, event assessment systems provide high accuracy and efficiency in determining risk during transactions.

Specific implementations described herein relate to systems and methods in assessing risk associated with a person-to-person (P2P) transaction using social tokens. Such transactions may be made by a payer/sender who has established an account with a P2P payment system and has designated a financial account (e.g., a bank account, credit card account, cryptocurrency account, etc.) that is used to fund a transaction. In establishing an account with a P2P payment system, the payer may provide a social token, such as a cell phone number or an email address, that is associated with the payer. Other types of social tokens may include, for example, QR codes assigned to a user (e.g., by a financial institution, third party payment processor, etc.), P2P (e.g., Zelle) user handles, debit card, personal ID, or other proxy for the user or social token. The payer identifies a payee/receiver, such as by providing a social token associated with the payee, such as the payee's cell phone number and/or email address, for use in initiating a payment (and possibly to notify the payee of the payment). Social tokens associated with payees and payers may be assessed using health scores that are analyzed and updated over time to help risk assessment of a transaction that includes the associated payees and payers. Health scores may be based on large amounts of data collected across large populations of people that may have accounts at financial and other institutions. Rules and models are developed to assess data (e.g., past transaction data, account data, and other risk-relevant data) associated with a social token and to assign a health score to that token, and therefore the person associated with that token.

In one embodiment, multiple different scores assigned to the same social token may be developed. A social token may have a general health score that assesses the social token in general, such as all of the transactions that the social token is used for. Furthermore, a social token may have a payer health score that represents a score for the social token when the social token is used by a user that is a payer in a transaction, and a payee health score that represents a score for the social token when the social token is used by a user that is a payee in a transaction. Yet another score (e.g., a joint/fusion score) score may also be assigned to tokens used by users as the payer and payee in combination (i.e., reflecting a risk associated with a transaction between that specific payer and payee). Thus, in described embodiments there may be four or many more types of scores associated with any given social token. In some cases scores may be calculated in advance and stored for use when a score (for a social token) is requested. In other embodiments, scores may be calculated when a transaction in question is being conducted based on current profile data stored in a profile system (and also data on the specific transaction in question).

FIG. 1 illustrates a block diagram representing a P2P payment transaction system 100 (i.e. an event system as also described herein), according to embodiments of the present technology. The system 100 collects data relating to social tokens associated with individuals or entities that may be a payer or payee in person-to-person (P2P) payment transactions. Some of the collected data may come from financial institutions 102, which provide account data on transactions conducted against accounts at those financial institutions (e.g., checks written from/deposited to an account, electronic debit/credit transactions against the account, and ACH transactions posted to the account), and account data relating to personal information on account holders and other information (such as account status) associated with each individual account at the financial institutions. Some of the collected data may come from a P2P payment system (e.g., Zelle) itself. For example, data may include data associated with transactions that a social token has been used for, how long a social token has been established for (e.g., whether the social token is brand new to the network), data associated with historical users of the token and information associated with each of those users, network behaviors associated with a social token over time, velocity of payments (e.g., the volume of payments sent/received over a certain time period, the number of times the token has registered to a new financial institution (FI) or demand deposit account (DDA) over a certain time period, the number of payments over a certain time period as compared to a different time period, etc.), how the social token is changing in the network over time including behavioral patterns, among other data.

However, other useful data may also be collected, such as data from fraud database services 104. Fraud database services 104 may include, for example, data from shared fraud and/or account abuse databases. Fraud database services 104 may include a national shared database that collects data associated with different users or social tokens over time. For example, such a service 104 may collect data associated with any transactions within or outside of a specific P2P payment system where a particular social token was used, and may include data such as status changes, velocity of check/ACH transactions, and others. Fraud database services 104 may provide data identifying social tokens that have been involved in possible fraud or account abuse in the past. Other data may be provided by social databases 106. Social databases 106 may include data from third-party P2P payment systems that maintain data for individuals that may have provided personal data, as part of, for example, setting up an account with a P2P payment system. While the system 100 is illustrated as receiving data only from financial institutions 102, services 104 and databases 106, these data sources are only examples, and other relevant transaction, account and risk data may be available from other sources (e.g., credit card companies, loan companies, merchants, etc.) and could be used by the system 100.

Some embodiments may be used to assess risk associated with types of transactions other than P2P transactions, such as for example paper checks, ACH transactions, credit card transactions, wire transfer, or others.

Data aggregating system 110 may collect all data from financial institutions 102, services 104, social databases 106, and any other sources relevant to the social token(s) being analyzed. In some embodiments, the financial institutions 102, services 104 and databases 106 may initiate a transfer of account data to a data aggregating system 110 on a periodic (e.g., daily or weekly) basis. In other embodiments, the aggregating system 110 may initiate the transfer of data by requesting data from each of the sources, either on a periodic basis or when data is needed for purposes of risk assessment. For example, a daily or weekly transfer of data may be sufficient in most cases for risk assessment, but when the risk assessment requires more up-to-date information, the data aggregating system 110 may request data (for all available account holders/social tokens, or for a social token) from any one of the sources that may have that data. The data aggregating system 110 stores the data that has been provided by the various sources for subsequent processing by a data associating/linking system 114.

The data associating/linking system 114 receives data from the data aggregating system 110 and analyzes such data to sort the data according to social token to whom the data is relevant for purposes of risk assessment. For example, the system 114 may look at data from the financial institutions 102 to find a common (same) social token across different accounts across one or more financial institutions. As a further example, system 114 may identify a social token that is used by a payee or payer in multiple transactions, where the transactions may be posted to different accounts across one or more financial institutions. The system 114 may then associate or link the data from each of those accounts or transactions as related to the same social token, in order to determine a health score and otherwise assess the risk associated with that social token.

The associating system 114 may use a number of different approaches for linking social tokens, individuals, transactions, and/or accounts. While an account holder ID (such as a name or social security number) may be used to retrieve data from the data aggregating system 110 for each account holder that maintains an account at one or more the financial institutions 102, different accounts having a common account holder may not always be easy to identify. For example, an account holder may use a middle name for some accounts and not for others. In cases of joint account holders, some accounts may use the social security number of one joint account holder and other accounts may use the social security number of the other joint account holder. Further, typographical errors when setting up the account, very common account holder names (e.g., John Smith), different addresses that have not been updated, and other issues may make it difficult to find all accounts of a payer or payee in a transaction. Generating and analyzing social tokens for risk assessment analysis solves many of these problems because a social token is unique and is typically not used by more than one person.

Once data records have been linked by the data associating system 114, profile system 120 may build profiles for social tokens. Generally, data that can be linked to a specific social token is placed in a profile by the profile system 120. Profiles may then later be used to create a health score for that social token. The risk system 100 further includes a risk/data assessment system 140 that is used, among other things, to calculate specific health scores for social tokens associated with profiles generated by profile system 120. Both profile system 120 and risk assessment system 140 are discussed in greater detail with respect to FIG. 2. The functionality of the data aggregating system, profile system, risk assessment system, fraud database services, and other subsystems within system 100 may be combined and/or performed by a single entity.

In some embodiments of the present technology, a user may have multiple social tokens. For example, a user may have multiple of a cell phone number, one or more email addresses, a facebook or Instagram handle, among others. Therefore, a user may have multiple health scores associated with the user based on the different social tokens associated with the user. Furthermore, the different social tokens associated with the same user may have different (sometimes very different) health scores. For example, a user's email address may have a high health score while the same user's phone number may have a low health score. The user may only use one of the user's social tokens when initiating a transaction, or a different user may only use one of the user's social tokens when initiating a transaction, and therefore the system may only have data associated with one health score associated with the user in determining the health score of a potential transaction or whether or not to approve the transaction. To remedy such a situation, a profile associated with the user may link the multiple social tokens associated with the user so that when one social token is used, data associated with all social tokens associated with the user are analyzed as part of the transaction analysis. Since the profile may have access to data associated with multiple social tokens associated with a user, the system may analyze transactions, develop health scores, and perform other actions based on a fuller picture of the user's actual risk when performing a transaction as a payee or a payer.

As described herein, the terms "transaction" and "event" may be used interchangeably. The terms "payee" and "receiver" may also be used interchangeably. The terms "payer" and "sender" may also be used interchangeably.

Figure 2:
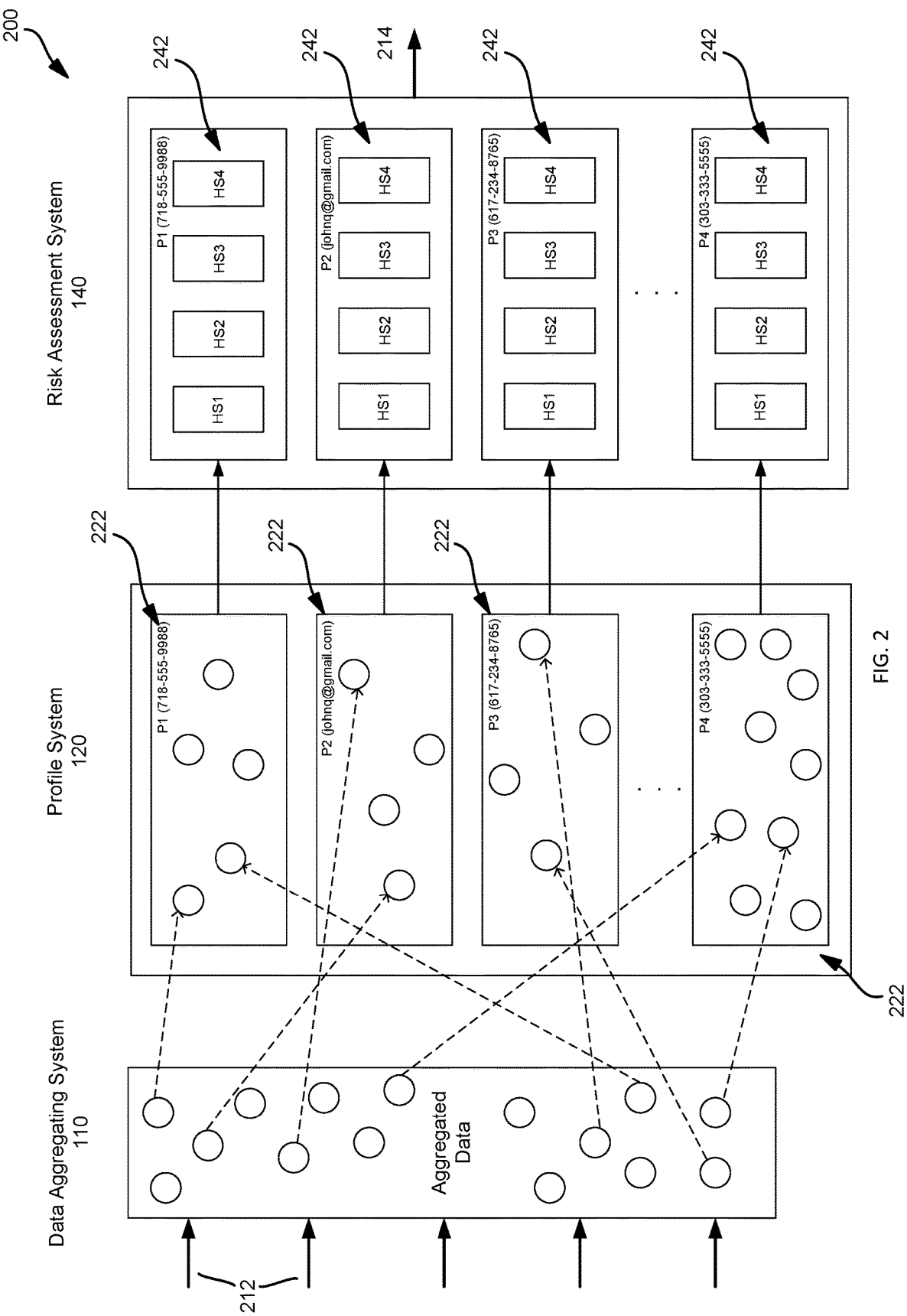
FIG. 2 illustrates a flow and block diagram 200 representing profiles and health scores for social tokens associated with a the event system, according to embodiments of the present technology.

FIG. 2 illustrates a flow and block diagram 200 representing profiles and health scores for social tokens associated with a P2P payment transaction system, according to embodiments of the present technology. Diagram 200 includes data aggregating system 110, profile system 120, and risk assessment system 140 as shown and described with respect to FIG. 1. As noted, data aggregating system 110 may receive data 212 from a variety of different sources. Data aggregating system 110 aggregates or collects data from these sources and compiles it to be used for analyzing the risk associated with transactions between parties, such as a payee and a payer. In a P2P transaction, each payee and payer are associated with a social token, such as a mobile phone number or an email address, and the data 212 collected by data aggregating system 110 may be associated with one or more social tokens. For example, data 212 may be associated with at least a payer social token and a payee social token. Data aggregating system 110 may organize data 212 by the social tokens it is associated with. For example, data aggregating system 110 may organize data 212 by payer, by payee, by social token, or a combination thereof. If aggregating system 110 associates a piece of data 212 with more than one, aggregating system 110 may copy data into multiple copies so that different copies may be saved or associated with different entities, such as a payee and a payer. Alternatively, data 212 may be stored in one place, and each data item 212 may be associated with or linked to a payee, payer, social token, or other tag. For example, a piece of data 212 may be copied to or linked to or associated with a social token in profile system 120, as shown in FIG. 2.

As noted, profile system 120 may build profiles (e.g., profiles 222, including P1, P2, P3, or P4 in FIG. 2) for social tokens, where data that can be linked to a specific social token is placed in a profile 222 by the profile system 120. Profiles 222 may then later be used to create a health score for that social token. In some embodiments, one individual social token may have multiple profiles of different types associated with it. For example, the same social token may have a separate payer profile, reflecting data (and/or a payer health score calculated from the data) for that social token when used as part of conducting a transaction as a payer, a separate payee profile, reflecting the data (and/or a payee health score) for that social token when used as part of conducting a transaction as a payee, and one or more joint profiles, reflecting data (and/or a joint health score) for that social token when used as part of conducting a transaction with each of various other social tokens which that same social token has or might conduct a transaction. For example, profile system 120 may generate and/or store a separate joint profile reflecting data (and/or a health score) for each possible pair of the social tokens associated with which data has been collected for transactions between two parties. The health scores may be generated at profile system 120 and sent to risk assessment system 140, or may be generated at and used by risk assessment system 140 (and possibly transmitted back to profile system 120 for storage, updating, or other actions). Risk assessment system 140 may include more data or other information that may be relevant for determining health scores, and therefore may determine and generate the health scores instead of profile system 120.

In some embodiments, profiles 222 may be assembled only when needed to calculate a payer, payee and/or joint health score, or may only be stored during the time needed for accessing profile data to create a health score. Alternatively, profiles may be generated in advance and stored for future use. When a health score needs to be calculated, the profiles may be updated dynamically, or they may not be updated and instead the system may rely on the latest previously saved version of the profiles. In such an embodiment, the profiles may be on a periodic or other predetermined updating schedule. In some embodiments, the stored profiles may consist of only data needed to uniquely identify a social token and a score for that token, with underlying data associated with the person retrieved on an as-needed basis.

Profile system 120 may include a data structure that stores the profiles after they are generated. The data structure of the database may provide advantages in the operation and use of the risk system 100. For example, organizing payer, payee and joint profiles into separate and discrete data structures and memory locations makes the data in those profiles more readily accessed for purposes of calculating separate payer, payee and joint scores for a social token. Therefore, such a structure would save time and be more efficient in calculating the scores. In some embodiments, data for different profiles may be stored in those profiles only when it is relevant to that particular profile. Thus, in those embodiments, the unique structure of the database 130 may significantly improve the speed and efficiency of computer operations and functions for performing health score calculations. Storing only the data necessary for each respective profile, or to calculate a respective health score associated with a specific profile, saves on considerable storage space and may affect the overall efficiency and speed of the computer retrieving data from storage. Furthermore, full or complete sets of data may be stored offsite and retrieved only when necessary, also contributing to additional storage and efficiency savings.

Risk assessment system 140 may be used to calculate specific health scores, such as health scores 242. As mentioned earlier, health scores 242 can be calculated at different times, such as in advance of a transaction to be evaluated, or on demand when the transaction is being evaluated. The risk assessment system 140 may use rules and logic to create health scores 242 on a periodic basis for each social token that is associated with data within the system. For example, health scores 242 may be updated at the end of each day after financial institutions 102 have provided updated transaction account data to the data aggregating system 110 and the updated data has been incorporated into the various profiles stored by the profile system 120. In some embodiments, each profile may include a health score 242 that is been periodically updated and when a risk assessment is requested, that score could be returned by the risk assessment system 140.

Although FIG. 2 includes profile system 120, some embodiments of the present technology may exclude the profile system 120 altogether. For example, data aggregating system 110 may be directly connected to or in communication with risk assessment system 140 and may provide data directly to risk assessment system 140 for risk assessment system 140 to determine and generate health scores 242 associated with social tokens. In other words, profiles such as those generated and stored within profile system 120 may not be necessary in certain embodiments for risk assessment system 140 to generate health scores according to embodiments of the present technology.

In other implementations, either in addition to or in lieu of periodically calculating health scores, a health score may be calculated at the time of a specific transaction, using transaction data for the specific transaction. Calculating or updating a score based on a specific transaction has significant advantages, such as being able to compare current transaction characteristics to transaction patterns based on past data. For example, when generating a joint health score, few or no past transactions between the two parties may exist, but the current transaction may be suspiciously consistent or inconsistent with transaction patterns based on past data that is associated with a payer or payee. For example, even though the system may not have any data representing any transactions between a particular payee and payer, a first transaction between the payee and payer may be consistent with a pattern of behavior by the payee or payer individually (e.g., transactions of particular/specific or high amounts, transactions of a particular type, etc.). Therefore, a joint health score may also be developed based on the individual actions of the two parties.

In some embodiments of the present technology, patterns may be determined based on certain specific characteristics of their previous habits. For example, if a payee is a landlord and historically only accepts payments for rent as a payee (and does not make payments as payer) in a specific pattern (e.g., one time per month in the first five days of each month), the landlord payee may have a high health score since that payee is viewed as low risk by the system. However, if the landlord then makes their first payment as a payer, the system may detect the transaction as having a low health score, and similarly may assign a low health score to the landlord as payer (as opposed to the landlord's higher payee). The system may use the pattern that the system determined over time associated with the landlord, specifically that the landlord had a pattern of only acting as a payee and not as a payer. For that reason, the landlord may not have even had a health score previous to the landlord's first payer transaction, which may indicate a high level of risk due to the unknown nature of the landlord as a payer. Furthermore, other characteristics of the transaction may also contribute to the landlord receiving a low payer health score (or the transaction receiving a low health score), such as the amount of the transaction, the device used to initiate the transaction, the location of the transaction, the payee of the transaction, among others. For example, if the landlord's first payment as a payer is for the exact same amount as the rent the landlord typically receives as payee (and/or the payment is to someone who the landlord typically receives payments from as payee), then the landlord's payer transaction may receive a higher score because the system may determine that the payment is a refund to the payee for rent or security deposit, etc. Alternatively, if the landlord's first payment is to an unknown person for a much higher amount of money, then the landlord's payer score may be low and the transaction may be declined due to that lower score.

In some embodiments of the present technology, another characteristic that could be considered by the system to determine a health score is a type of business that may be associated with a particular social token, and transaction activity by that business. For example, a type of business (plumber vs. landlord) may change whether certain activity is negative or not, or even negative as opposed to positive. For example, if a plumber, seller, or other similar business who sells goods or services has a high rate of return activity, that pattern may be indicative of a seller or service provider not delivering on the good or service that the company promised. However, the same or a similar pattern shown by a landlord may be indicative of the landlord making improvements to the property that the landlord is renting to the payee, and therefore indicative of a landlord that should have a high level of trust (and therefore a high health score) by the system. Other characteristics of a business or a transaction participated in by the business may be relevant, such as the MCC code associated with the business (is the MCC code typical of the relevant type of business participating?), among others.

As noted herein, different weights may be assigned to the different characteristics analyzed to determine health scores, and therefore characteristics with higher weights may have a greater impact on a health score than characteristics with lower weights, and vice versa. For example, if the system considers the pattern a more valuable characteristic than amount of the payment, then the pattern may be assigned a higher weight than the amount of the payment, and the pattern may have a greater impact on the health score of the payer/payee or the transaction. Therefore, for example, if a transaction has similar characteristics to a previously identified pattern, then a high transaction amount may not be enough to overcome the pattern, which may have a greater weight in calculating the health scores associated with a party or a transaction than the amount of the transaction.

After the risk assessment system 140 (or, in some embodiments, profile system 120) generates one or more health scores, one or more of the health scores may be outputted as data 214. The health scores may be outputted to an inquiring institution, such as a bank (e.g., one of the financial institutions 102) for analyzing the risk of a specific transaction, or to any other party or entity that may have some involvement or interest in the transaction. For example, health scores or related analyses may be provided to a bank maintaining an account (for a payee) into which funds are to be ultimately transferred, an entity processing the transaction (such as the P2P payment processor), and/or any of the direct parties to the transaction (payer, payee). Health scores may be used by a financial institution (or a third party payment processor) to approve or decline a transaction. Health scores may also be used to inform a financial institution (or other third party) so that they can make such a decision in the future, or to make a suggestion as to whether or not the institution should approve or deny the transaction. Health scores may alternatively been used as a proxy for a user's identity, or for such authentication methods as identity proofing or determining identity confidence. Users (or financial institutions) may use health scores for promotion, such as for promotion of financial identity, credit worthiness, security, or liability associated with a social token.

In some embodiments, if health scores are determined and are low enough to result in a determination that a social token is being used for fraud or other high risk actions (e.g., non-payment), the health score may be used to shut down an account associated with the social token (e.g., an account for which the social token is used as a username). For example, the health score may prompt, either automatically or manually, a mobile phone or other application to prevent the user from logging in to use an associated P2P payment system, or to "lock out" the user. The user may be locked out at the application itself, or on the server level during authentication or sign-in. In some embodiments, the token itself may be locked so that the token is not usable for signing in. The health score may indicate, for example, that the transaction is a high-risk transaction such that the system will block the user from using the token or initiating the transaction. When the user attempts to make a payment or use the token, the system will block the transaction from happening. For example, in response to the request, a response from the network will be sent either to the financial institution or at a network level the system will decline the user from using the app. A notification may appear to the user indicating this decision by the system.

The health score may also be used, in conjunction with a user application or otherwise, as part of a system to contact a user directly or to help authorities (e.g., police department or FBI) make contact with the user to question or arrest the user. For example, a low health score may cause a prompt on the user's (the user associated with the social token) application to contact the financial institution, or another entity. A "low health score" may be determined, for example, by comparing the health score to a predetermined or dynamic (periodically updated or always changing) threshold or limit. In some embodiments, if multiple health scores are determined, one or more than one health score of the group of health scores may need to be below (or above) a certain threshold (or different respective thresholds) for such an action to be taken. The dynamic nature of the threshold may be such that the threshold changes based on various factors.

A social token may be locked using various methods. For example, if a user uses a network device application (e.g., representing the P2P payment system 108) to input their social token to initiate a transaction, a communication may be transmitted from the network device to the data aggregating system 110 or directly to a financial institution 102. System 100 may then, either from data aggregating system 110, financial institution 102, or another subsystem, analyze the payer social token, payee social token, transaction amount, and other data associated with the transaction. If the payer's social token has been locked (e.g., entered into a database of social tokens that have been locked), the system 100 may then determine that the social token is not eligible to initiate the transaction. The system 100 may then take various actions, including transmitting a notification to the application on the user's network device to inform the user that the social token has been locked and the transaction is not possible, or may notify the user in a different way. The system 100 may lock the application completely by preventing any log-ins using the user's social token or otherwise. The application may be locked for a predetermined or dynamic amount of time, or may be locked indefinitely. These actions may also be performed even if the social token has not been generally locked (i.e. no transactions allowed) and instead a single transaction is declined based on the health scores associated with the specific transaction.

If the health score of a social token is low enough for a social token, user, or application to be locked based on that health score, various benefits may exist for a financial institution associated with the transaction. For example, a high risk user may not be able to then initiate transactions, which are highly likely to be fraudulent. If a social token is locked, then no transactions with that social token may be initiated. However, if a user's profile or device application is locked, then the user may be prevented from initiating any transactions with any of their social tokens. That would then require the user to obtain a new device and/or new social token to initiate a transaction to get around the lock-out.

After a social token, device, user, application, etc. are locked out, a notification may be sent to the user via the application, or using one of the user's social tokens, such as using the user's phone number (e.g., text message) or email address. If the user receives a notification on their device via an application, the notification of lock-out may be presented with methods of the user unlocking their social token or application/device. For example, the user may choose the option to perform certain authentication actions so that the system can confirm the user's identity.

Thresholds may dynamically change over time due to various data or factors. For example, a threshold may dynamically change over time based on certain baseline factors or characteristics associated with a user or social token. For example, a social token may have a certain threshold associated with it because the social token is associated with a business as opposed to an individual user. In another example, social tokens may have a certain threshold associated with it based on a combination of factors or characteristics, such as whether it's associated with a business or individual, value of transactions over a period of time, among other characteristics. When the characteristics that contribute to the threshold change, the threshold itself may change. Furthermore, the characteristics that contribute to determining the threshold may change themselves. For example, the characteristics may be determined based on a machine learning algorithm that determines the characteristics that are the most impactful on, or most determinative of, risk associated with a social token or a transaction.

There also may be a second threshold or other type of override feature assigned to a threshold. For example, a threshold may automatically not apply to a certain threshold based on a high enough score associated with a social token, or for other reasons (e.g., manual setting by financial or other institution, certain type of user, etc.). An option may also be provided for the user to be able to override the decision based on using certain other features, such as particular types of authentication (e.g., two-factor authentication). In some embodiments of the present technology, the override feature assigned to a particular threshold may be consistent among different financial institutions, or the system may allow for each financial institution to customize their override feature based on the desires or needs of that particular financial institution. Furthermore, in some embodiments of the present technology, the thresholds may be fixed or may be variable.

The system 100 may take alternative actions other than locking a social token completely such that it cannot be used. For example, if a health score of a transaction, or a payee or payer, is low but not lower than the threshold to cause a lock-out, the system may instead transmit a notification on a GUI associated with the social token (e.g., via an application on a network device associated with the user). The notification may include a request for the user to confirm details of the transaction to confirm that the transaction is legitimate and not fraudulent. For example, the notification may request that the user include additional details about the payee, additional details about the transaction, additional details about the payee/user, additional details about the user's financial institution or account being used for the transaction, among other options. In some embodiments, the system may establish a threshold range (i.e. a lower threshold and an upper threshold) within which the system transmits such a notification. The lower threshold may also be the same as the threshold under which the user's social token gets locked by the system. Furthermore, if the health score is above the upper threshold, additional actions may take place. In other words, the system may include one or more ranges, distinguished by thresholds, within which different events are triggered, where the events may correlate to the amount of risk associated with the social token or transaction. The events may be more or less stringent based on proportionally larger or smaller health scores associated with a payee, payer, or the specific transaction.

While some described embodiments relate to health scores associated with social tokens owned by individuals, social tokens discussed within embodiments described herein may instead be owned and used by an organization or entity (e.g., a company that is either a payer or payee in a P2P payment transaction). In some embodiments, a party to a transaction (payee or payer) may be more than one person (e.g., the co-owners of a joint account used for funding or receiving a payment), and health scores for such social tokens maybe based on past data for those persons, either as individuals or acting together, or a combination of both.

Figure 3:
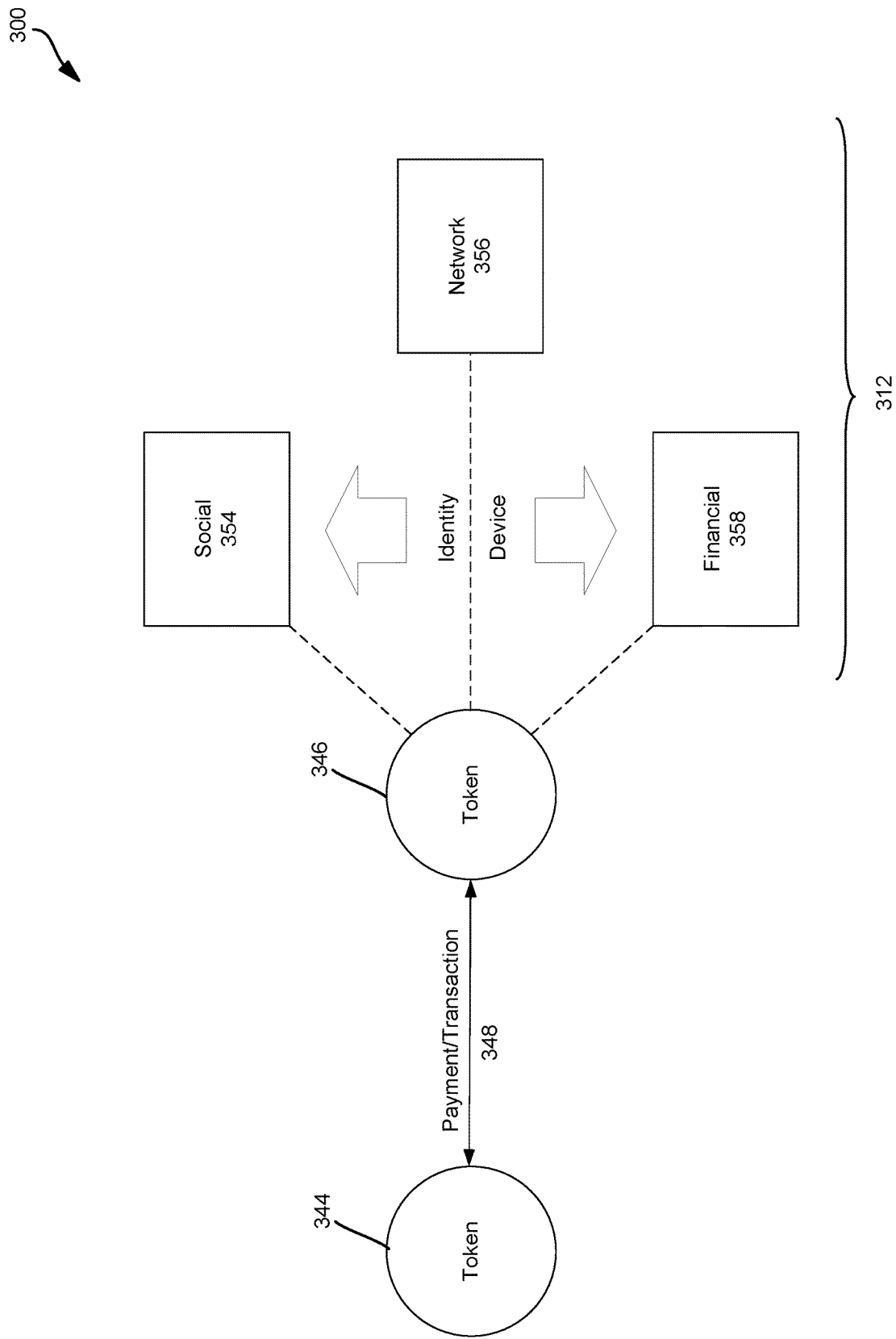
FIG. 3 illustrates a diagram 300 that shows how an event system assesses the health of a social token, according to embodiments of the present technology.

FIG. 3 illustrates a diagram 300 that shows how a P2P payment transaction system assesses the health of a social token, according to embodiments of the present technology. A payment or another type of transaction 348 processed by a P2P payment system may include two parties, such as individual users or other entities, that are associated with social tokens, such as social tokens 344 and 346. In some embodiments, a social token associated with a party, such as token 346, may be determined using a variety of different types of data 312. Specifically, data 312 may include data associated with the identity of the social token, or a person or entity that owns the social token, and/or data associated with a network device associated with the social token, or one or more network devices associated with a person or entity that owns the social token. Specifically, the data may include, for example, social data 354, network data 354, and/or financial data 348, among others. Social data 354 may include any data associated with social aspects of the social token 346, or one or more people associated with the social token 346, such as the social token's history, including age (e.g., length of history with token, such as its association with the token's owner), status, type, association with certain negative characteristics (e.g., a predetermined list of characteristics), among other things. Network data 356 may include a variety of other types of data related to the token's history, such as status of the token, changes to the token over time, and the token's velocity in the network. Furthermore, network data 356 may include a full set of transactional behavior and spending patterns associated with the social token, as well as device information associated with network transactions completed or attempted in the past. Financial data 358 may include the token's association with the owner's financial identity, financial account profile (e.g. total banking relationship), and device information received from financial interactions over time. The breakdown of the different types of data into different categories is for example purposes only and the different categories may be nonexistent or break down differently due to overlap among the categories.

Health scores for social tokens may be determined using a variety of different techniques. For example, different features, which may be defined by data collected over a period of time (e.g., history of the social token), may be combined to generate the health score. Different weights may be applied to each of the different features depending on the relative importance of the feature and the data assigned to or linked with (e.g., via data associating/linking system 114 as described with respect to FIG. 1) that feature. The features and their respective weights may be predetermined and applied to the data, or the features and/or their respective weights may be dynamic and may change over time. For example, different features may be more important for certain types of social tokens, or for certain types of owners of social tokens (e.g., certain types of businesses, people, etc.), so the weights may change accordingly. In some embodiments, if a social token is associated with a person who owns a substantial amount of assets, a certain feature may be given more or less weight than that same feature would be for someone with no or very little assets. In some embodiments, a combination of predetermined and dynamic features and weights may be appropriate. For example, certain features may be important for all types of social tokens and the risk analysis associated with them (e.g., length of use of social token, number of or type of fraud or misuse-related incidents associated with the social token, etc.), whereas others may change depending on the social token, type of social token, or characteristics of the owner(s) of the social token. In some embodiments, a baseline model may be developed to identify those features that are important to everyone and their respective weights, and the model may be applied to each dataset. In some embodiments, a suite of models may be available, and the different models may apply to different types of social tokens, owners, etc. One or more of the suite of models may be applied up front, and then adjusted models or features may be applied over time to apply the dynamic aspects of the risk determination.

One or more baseline models may be applied to the data associated with a social token to determine an initial social token health score. As more data is collected and entered into the dataset, the health score may be updated over time. For example, a dynamic model that changes over time as new data is entered may be applied on a periodic basis to the dataset and determine if there has been a change in health score. If a new health score is determined, or a previous health score is adjusted, a notification may be transmitted to the system, to one or more specific financial institutions, to one or more users/owners, etc. For example, a token score baseline may represent an average health of the token. Specifically, to be considered a token with high enough of a health score to complete a transaction, a token may be required to be established for more than six months with at least two successful transactions as payee and one or more transactions as payer at this specific location using the same single device associated with the token. The more successful transactions that occur, the more time the token is established, and the longer time without complaints associated with the token, the higher the health score of the token.

Patterns associated with a specific social token, or with one or more different types of social tokens, may be determined by profile system 120 or risk assessment system 140. The patterns may be determined by analyzing data received over time that are associated with or linked to a particular social token, or to a group of social tokens that have one or more characteristics in common (e.g., social token types). The patterns may be used to compare with later social token features or characteristics to determine if that social token fits the pattern and should therefore have a certain health score, or whether an already determined health score should be adjusted. For example, a feature may include the type of transactions that may be normal for a specific type of user, or a specific business, that may be associated with or that may own a particular social token.

Another important type of data that may be relevant to determining a health score of a social token may include data associated with whether the token has been associated with a negative history, including data associated with previous transactions associated with the social token where the transaction was deemed by a financial or other institution to be fraudulent or include other negative history. The value of this data may be determined using a variety of factors, including the amount of money at stake in the transaction(s) with negative history, either individually or cumulatively, the number of negative transactions in total, the amount of time passed between the last negative transaction and the current transaction, the velocity with which the negative transactions increased over time, and other information. For example, if a social token had an associated negative transaction a long time ago, but hadn't had one since, that characteristic is likely to hold less weight than a social token with a negative transaction in the recent past (e.g., a recent indication or reported fraud or scam on the account). Similarly, if a social token had one associated negative transactions in its history, that characteristic is likely to hold less weight than a social token with many negative transactions in the past.

Another important type of data that may be relevant to determining a health score of a social token may include the proportion of transactions where the social token was used to send money as a payer as compared to where the token was used to receive money as a payee. For example, having all transactions as payer or payee and no transaction as the other may indicate a characteristic that may be weighted higher than a social token with an equal or substantially equal number of transactions as payer and payee.

Another important type of data that may be relevant to determining a health score of a social token may include the types of transactions associated with the social token, such as whether the social token is being used just to send/receive money or whether the social token is being used for consumer or business type transactions. The combination of different types of transactions, in combination with other features or characteristics of the social token, may help determine a health score of the token.

Another important type of data that may be relevant to determining a health score of a social token may include the device or devices used in conjunction with the social token. For example, if the devices being used with the social token are consistent, such as a single mobile device for three years, that characteristic is likely to increase the health score of the social token due to consistency of use and less likelihood that the social token is associated with negative transactions. One or more devices may be identified as trusted devices associated with the user over time, and whether or not the user is using a trusted device may be indicative of a higher or lower health score of the token, user, or transaction. For example, a device may become trusted if it has a long history of successful (non-fraudulent or suspicious) transactions performed from it. Alternatively, a device may become trusted if it was authenticated by the user, such as using two-factor authentication or another form of authentication. A device may go from being trusted to untrusted if the device isn't used for a long period of time, such as a period of time greater than a certain threshold period of time as set by a user, a financial institution, or another entity. The threshold may also be variable/dynamic over time such that it changes based on using machine learning or an algorithm that assesses changes in the market or using data across many different users/institutions. Alternatively, a device may become trusted based on having consistent transactions used from the device and without going a long period of time without a transaction being processed using the device by the user.

Other actions outside of the transaction itself but also associated with the device may be indicative of a factor that may raise or lower a health score associated with a social token, user, or transaction. For example, actions taken by the user or by anyone on the device may raise or lower the system's confidence that a later transaction is low risk. For example, actions may be taken on the device that indicate fraud or that the device was hacked leading up to the transaction being initiated, which may lower a health score of a token associated with the device or a user of the device. Alternatively, consistent regular use of the device by the user and following patterns that fit with the user's use or lifestyle may be indicative of a low risk device and/or transaction that follows. In some embodiments, for example, if only one or two social tokens are used by a user of the device, the system may conclude that the user or transaction is low risk, and therefore may have a higher health score. However, many different social tokens being used over a short period of time on a specific device may indicate that the device has been hacked, or that the user of the device is attempting to commit fraud, and therefore may lower a health score associated with the device, user, or transaction being processed.

While the use of social tokens benefit from the fact that they tend to be unique for long periods of time, they may still be passed from owner to owner throughout the lifespan of the social token. For example, if an owner gives up a mobile phone number or stops using an email address for a long period of time, the company that assigned the phone number or email address to the user may ultimately assign them to other owners. Therefore, another important type of data that may be relevant to determining a health score of a social token may include whether the social token was passed from one owner to another. For example, if based on data obtained by the system indicates that a token has changed owners, the health score of the token may be reset. For example, this data may be determined by various methods, such as looking at additional personally identifyable information (PII) data and to notice that the user's name associated with the token is different, a notification may be received from a third party, such as a phone service provider, that identifies that the token has changed hands, among other options. In some embodiments, if certain negative incidents impacting a health score of the social token are determined to be associated with a previous owner of the social token, then one or more weights assigned to those incidents when calculating the health score may be reduced or the incidents may be removed altogether from the algorithm to more accurately assess the current owner's risk. In some embodiments, a time period threshold (either predetermined or dynamically changing based on factors associated with the social token) may be used to determine when or if a social token's history/data should be reset due to a change in ownership of the social token. In some embodiments, data received or determined from the new owner of the social token may have an impact on what the threshold is or how much of the previous history associated with the social token should be preserved and how much (or which) data should be preserved. For example, a risk or probability of risk may be calculated that identifies the likelihood that a token was passed from one person to another based on the various above factors. For example, the likelihood may be high if the transaction history using the token changes dramatically and suddenly. In another example, the likelihood may be high if the token is not used for a period of time, indicating that the former owner of the token has stopped using the token, followed by immediate new use of the token in a pattern different than with the previous owner. In another example, the likelihood may be high if a new account is opened at a financial institution or another entity using the entity with a different name or other PII associated with it.

Figure 4:
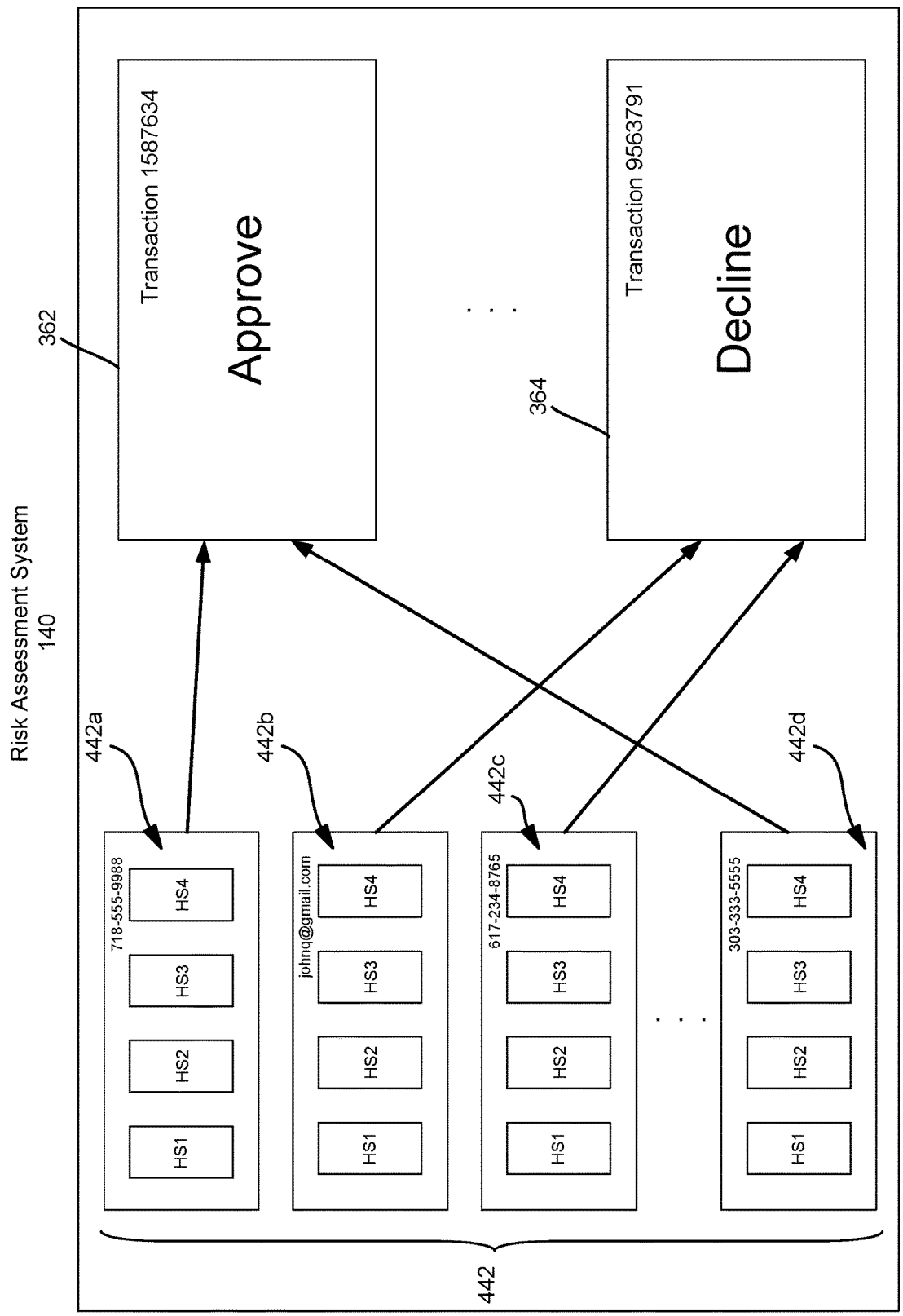
FIG. 4 illustrates a use case associated with an assessment 140, according to embodiments of the present technology.

FIG. 4 illustrates a use case associated with risk assessment 140, according to embodiments of the present technology. Risk assessment 140 includes one or more (in this example, four) social tokens 442 (with profiles or otherwise) with health scores associated with each. As noted, the health scores may be of a variety of different types. For example, HS1 may include a general health score that takes into account all data associated with the social token, HS2 may include a payer health score, HS3 may include a payee health score, etc. Risk assessment system 140 is configured to determine risk associated with transactions using health scores associated with social tokens. For example, risk assessment system 140 also includes example transaction 362 and transaction 364. Transactions are approved or declined based on a variety of factors, including, for example, health scores associated with the social tokens involved in the transactions.

As shown in FIG. 4, transaction 362 includes parties that are associated with social token 442*a* (718-555-9988) and social token 442*b* (phone number 303-333-5555). In other words, a party with the social token phone number 718-555-9988 initiated a transaction (e.g., to send money) to the social token phone number 303-333-5555, or alternatively a party with the social token phone number 303-333-5555 initiated a transaction (e.g., to send money) to the social token phone number 718-555-9988. After risk assessment system 140 receives an indication of the transaction from the payer, the risk assessment system 140 should have access to (e.g., previously or currently received from the payer) data associated with the payer and data associated with the payee, including social tokens (and their respective health scores) associated with each. For example, risk assessment system 140 may have data associated with the payer because the payer may have an account set up with the P2P risk assessment system 140, and therefore may have previously provided data associated with the payer, including a social token associated with the payer, to the risk assessment system 140. The payee may also have provided data associated with the payee, including a social token associated with the payee (and possibly other information such as the amount of the transaction, etc.) when the payer initiated the current transaction.

After risk assessment system 140 receives an indication of the transaction from the payer, the risk assessment system 140 may then use data associated with the payer and data associated with the payee, including the social tokens (and their respective health scores) associated with each, to assess risk associated with transaction 362. The result of assessing risk associated with transaction 362 may include, for example, a risk score. In some embodiments, the risk score may be a score independently and separately developed and determined using a model and/or algorithm and takes into account data associated with the payee and payer, including their respective health scores. In some embodiments, the risk score may include an analysis and/or combination of health scores associated with the social tokens involved in the transaction. In an example, a risk score may include a confirmation that the health scores for the social tokens owned and used by the payee and payer involved in the transaction are above a certain predetermined (or dynamically changing) threshold. As such, risk assessment system 140 analyzed social token 442a and 442d, their respective health scores, and possibly other data to determine that transaction 362 should be approved. In another example, risk assessment system 140 analyzed social token 442b and 442c, the social tokens owned by parties on either side of transaction 364, their respective health scores, and possibly other data to determine that transaction 362 should be declined.

Figure 5:
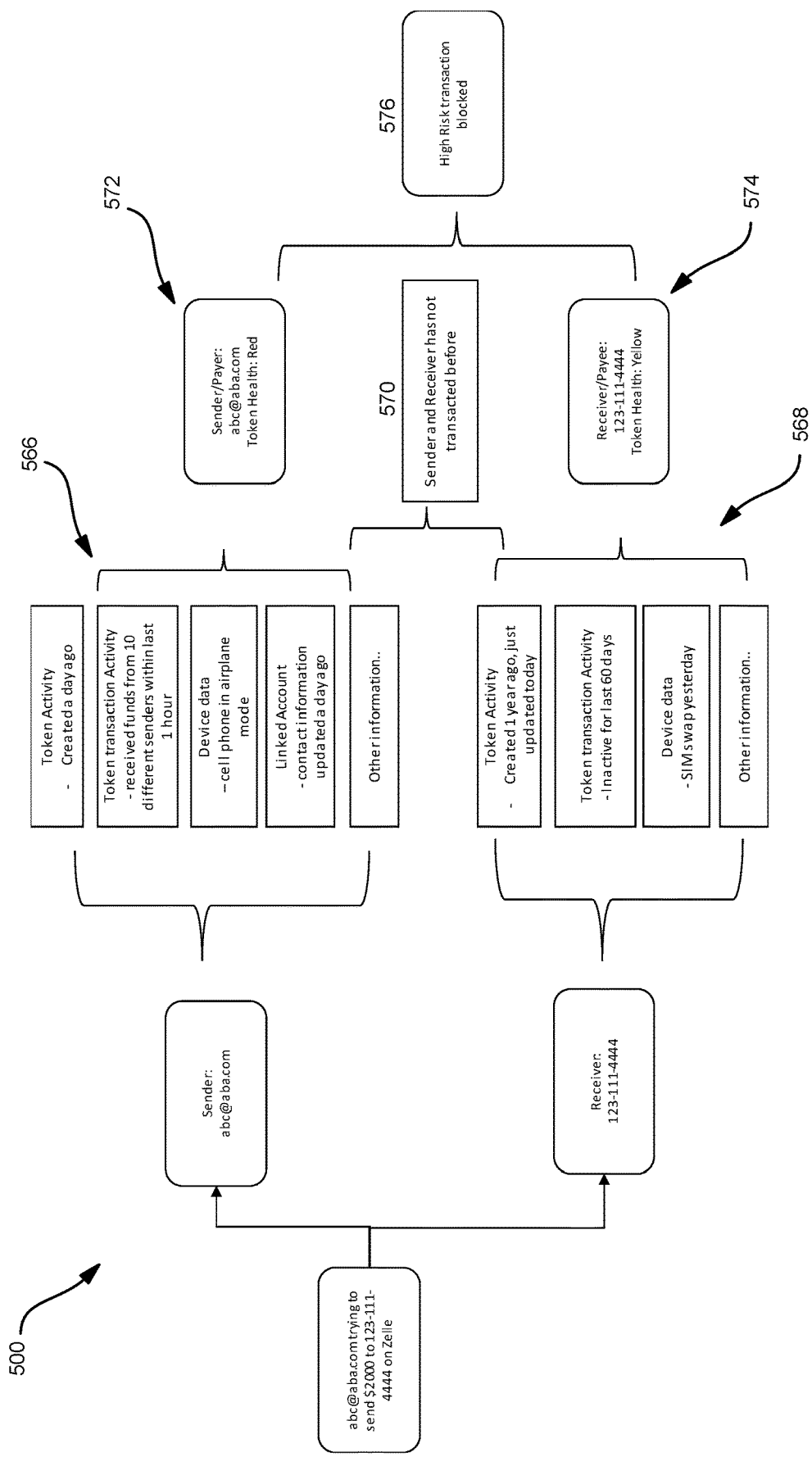
FIG. 5 illustrates an example algorithm for generating and using token health scores, according to embodiments of the present technology.

FIG. 5 illustrates a flow diagram 500 representing an example algorithm for generating and using token health scores, according to embodiments of the present technology. In this example, a transaction between a sender/payer with social token abc@aba.com is initiating a transaction including sending of two-thousand dollars to a receiver/payee with social token 123-111-4444. Once the system receives an indication of the initiated transaction, the system amalyzes the social tokens and any data associated with the social tokens it has to determine token health scores. The system (e.g., data aggregating system) analyzes the relevant data 566 for each social token and determines the health of each token. For example, for social token abc@aba.com, the system may analyze token activity associated with the token (i.e. it was created one day ago), transaction activity associated with the token (i.e. the token has received funds from ten different senders within the last one hour), device data associated with the device being used to initiate the transaction using the token (i.e. the device is a cell phone in airplane mode), any accounts linked to the social token (i.e. contact information updated one day ago), and any other information. Similar information may be analyzed about the other social token, phone number 123-111-4444, involved in the transaction. For example, the system may analyze data 568 associated with that social token.

The system may then determine token health scores 572 and 574. For example, payer social token abc@aba.com may be determined to have a particularly bad health score based on the data associated with the social token. The health score may therefore translate to a certain color indicating a range/group of negative/bad scores (e.g., the score is "red"). The other social token, payee social token 123-111-4444, may receive a score higher than the payer social token, and may be characterized as having a medium health score (e.g., the score is "yellow"). Furthermore, joint data 570 may be compiled, where joint data 570 includes data associated with both social tokens involved in the transaction. For example, joint data 570 may include any transactions (e.g., number of transactions, substance of transactions, etc.) associated with both social tokens involved in the transaction. Based on the health scores, the system may determine at 576 that the transaction will be declined, blocked, or take other action that indicates concern with the transaction. For example, such action may include a notification to the user's device of the concern, including an option for the user to continue with the transaction at the user's own risk, or delete the transaction so that it does not go through, among other options. As described herein, the system may go as far as to prevent one or more users associated with the transaction to be blocked out of an associated P2P application on their device, or on all devices associated with those users. For example, the system may block the social tokens (e.g., and any other social tokens associated with the users) from being used to log in to the application.

FIG. 6 illustrates a flow chart including a method directed to assessing risk associated with a payment-to-payment (P2P) transaction using social tokens, according to embodiments of the present technology. Step 602 includes receiving data associated with a payer including a social token associated with the payer. The receiving, or any other step in this process, may be performed by a processor of a data assessment system. The data associated with the payer may be used by the data assessment system to generate a P2P account associated with the payer. Step 604 includes receiving account data associated with a plurality of accounts maintained at the entities. The receiving may be from one or a plurality of entities. The account data may include at least data pertaining to transactions conducted against each of the plurality of accounts. Step 606 includes generating a health score for the social token associated with the payer. Generating the health score for the social token associated with the payer may include analyzing data associated with the payer, data associated with the social token associated with the payer, and/or account data received from the plurality of entities. Step 608 includes receiving data associated with a transaction initiated by the payer using the P2P account associated with the payer. The receiving may be from the payer at an application displayed on a graphical user interface (GUI) of a network device associated with the payer. The data associated with the transaction initiated by the payer may include at least a social token associated with a payee of the transaction. Step 610 includes generating a health score for the social token associated with the payee. Generating the health score for the social token associated with the payee may include analyzing data associated with the payee, data associated with the social token associated with the payee, and/or account data received from the plurality of entities. Step 612 includes determining a health score for the transaction. Determining the health score may include using the health score for the social token associated with the payer and/or the health score for the social token associated with the payee. Step 614 includes determining that the transaction should be declined based on the health score for the transaction. Step 616 includes locking the application at the network device associated with the payer. Locking the application may be based on determining that the transaction should be declined and at least a portion of the received account data associated with the plurality of accounts maintained at the entities.

Figure 7:
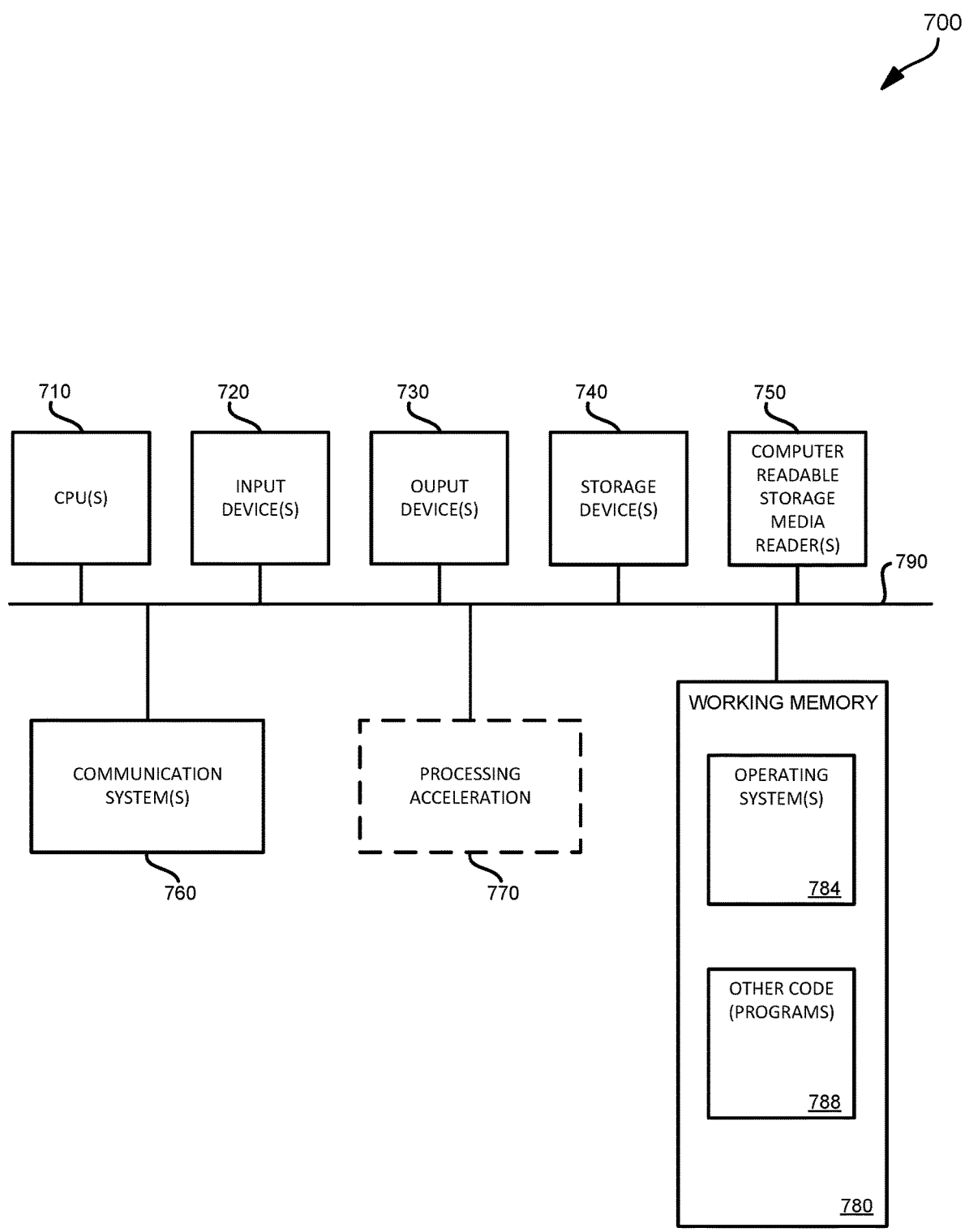
FIG. 7 is a block diagram illustrating an exemplary computer system upon which embodiments of the present invention may be implemented.

FIG. 7 is a block diagram illustrating an exemplary computer system upon which embodiments of the present invention may be implemented. This example illustrates a computer system 700 such as may be used, in whole, in part, or with various modifications, to provide the functions of the duplicate transaction detection system 110, as well as other components and functions of the invention described herein.

The computer system 700 is shown comprising hardware elements that may be electrically coupled via a bus 790. The hardware elements may include one or more central processing units 710, one or more input devices 720 (e.g., a mouse, a keyboard, etc.), and one or more output devices 730 (e.g., a display device, a printer, etc.). The computer system 700 may also include one or more storage devices 740, representing remote, local, fixed, and/or removable storage devices and storage media for temporarily and/or more permanently containing computer-readable information, and one or more storage media reader(s) 750 for accessing the storage device(s) 740. By way of example, storage device(s) 740 may be disk drives, optical storage devices, solid-state storage device such as a random access memory ("RAM") and/or a read-only memory ("ROM"), which can be programmable, flash-updateable or the like.

The computer system 700 may additionally include a communications system 760 (e.g., a modem, a network card—wireless or wired, an infra-red communication device, a Bluetooth™ device, a near field communications (NFC) device, a cellular communication device, etc.) The communications system 760 may permit data to be exchanged with a network, system, computer, mobile device and/or other component as described earlier. The system 700 also includes working memory 780, which may include RAM and ROM devices as described above. In some embodiments, the computer system 700 may also include a processing acceleration unit 770, which can include a digital signal processor, a special-purpose processor and/or the like.

The computer system 700 may also comprise software elements, shown as being located within a working memory 780, including an operating system 784 and/or other code 788. Software code 788 may be used for implementing functions of various elements of the architecture as described herein. For example, software stored on and/or executed by a computer system, such as system 700, can be used in implementing the processes described herein.

It should be appreciated that alternative embodiments of a computer system 700 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown). Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. Furthermore, the system or systems discussed herein are not limited to any particular hardware architecture or configuration. A computing device includes any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device. Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

While the various flows and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A system for determining the health of social tokens, the system comprising:
a processing unit comprising one or more processors; and
memory coupled with and readable by the processing unit and storing therein a set of instructions which, when executed by the processing unit, causes the system to perform operations including:
receiving data associated with a sender including a social token used by the sender, wherein the data associated with the sender is used by a data assessment system to generate an account associated with the sender;
receiving from a plurality of entities, account data associated with a plurality of accounts maintained at the entities, wherein the account data includes at least data pertaining to use of the social token in transactions conducted using each of the plurality of accounts;
generating a health score for the social token used by the sender, wherein:
the health score is indicative of a level of risk for transactions that use the social token used by the sender; and
generating the health score for the social token associated with the sender comprises analyzing the data pertaining to use of the social token used by the sender in transactions conducted using each of the plurality of accounts, wherein the health score for the social token comprises one or both of a score that is indicative of a level of risk for use of the social token by the sender as a payee in a transaction and a score that is indicative of a level of risk for use of the social token by the sender as a payer in a transaction;
receiving, from the sender at an application displayed on a graphical user interface (GUI) of a network device associated with the sender, data associated with a transaction initiated by the sender using the account associated with the sender, wherein the data associated with the transaction initiated by the sender includes at least a social token used by a receiver of the transaction;
generating a health score for the social token used by the receiver, wherein generating the health score for the social token used by the receiver includes analyzing data associated with the receiver, data pertaining to use of the social token used by the receiver in one or more prior transactions, and account data received from the plurality of entities;
determining a health score for the transaction using the health score for the social token used by the sender and the health score for the social token used by the receiver;
determining that the transaction should be rejected based on the health score for the transaction; and
based on determining that the transaction should be rejected and at least a portion of the received account data associated with the plurality of accounts maintained at the entities, locking the application at the network device associated with the sender.

2. The system of claim 1, wherein locking the application at the network device associated with the sender includes locking the application at the network level to cause the application at the network device to be locked.

3. The system of claim 1, wherein determining that the transaction should be rejected based on the health score for the transaction includes comparing the health score to a threshold health score.

4. The system of claim 1, wherein the operations further include:
after determining that the transaction should be declined, accessing a set of rules that indicate whether the declining of the transaction should be overridden;
determining that the transaction should be approved based on the set of rules; and
based on determining that the transaction should be approved, unlocking the application at the network device associated with the sender.

5. The system of claim 1, wherein the operations further include:
receiving updated data associated with a sender including the social token used by the sender;
receiving, from the plurality of entities, updated account data associated with the plurality of accounts maintained at the entities, wherein the account data includes at least data pertaining to transactions conducted against each of the plurality of accounts;
generating an updated health score for the social token used by the sender; and
determining that the transaction should be approved based on the updated health score.

6. The system of claim 1, wherein the social token is a QR code that was assigned to the receiver by the data assessment system to replace another social token submitted by the sender.

7. The system of claim 1, wherein the operations further include using the generated health score to generate a receiver health score for the social token associated with the sender for use in future events associated with the sender as receiver.

8. A computer-implemented method, the method comprising:
receiving, by a processor of a data assessment system, data associated with a sender including a social token used by the sender, wherein the data associated with the sender is used by the data assessment system to generate an account associated with the sender;
receiving, by the processor of the data assessment system, from a plurality of entities, account data associated with a plurality of accounts maintained at the entities, wherein the account data includes at least data pertaining to use of the social token in transactions conducted using each of the plurality of accounts;
generating, by the data assessment system, a health score for the social token used by the sender, wherein:
the health score is indicative of a level of risk for transactions that use the social token used by the sender; and
generating the health score for the social token used by the sender comprises analyzing the data pertaining to use of the social token used by the sender in transactions conducted using each of the plurality of accounts;
receiving, from the sender at an application displayed on a graphical user interface (GUI) of a network device associated with the sender, data associated with a transaction initiated by the sender using the account associated with the sender, wherein the data associated with the transaction initiated by the sender includes at least a social token used by a receiver of the transaction;

generating, by the data assessment system, a health score for the social token used by the receiver, wherein generating the health score for the social token used by the receiver includes analyzing data associated with the receiver, data pertaining to use of the social token used by the receiver in one or more prior transactions, and account data received from the plurality of entities, wherein the health score for the social token comprises one or both of a score that is indicative of a level of risk for use of the social token by the sender as a payee in a transaction and a score that is indicative of a level of risk for use of the social token by the sender as a payer in a transaction;

determining, by the data assessment system and using the health score for the social token used by the sender and the health score for the social token used by the receiver, a health score for the transaction;

determining, by the data assessment system, that the transaction should be rejected based on the health score for the transaction; and based on determining that the transaction should be rejected and at least a portion of the received account data associated with the plurality of accounts maintained at the entities, locking the application at the network device associated with the sender.

9. The method of claim 8, wherein locking the application at the network device associated with the sender includes locking the application at the network level to cause the application at the network device to be locked.

10. The method of claim 8, wherein determining that the transaction should be rejected based on the health score for the transaction includes comparing the health score to a threshold health score.

11. The method of claim 8, further comprising:
after determining that the transaction should be declined, accessing a set of rules that indicate whether the declining of the transaction should be overridden;
determining that the transaction should be approved based on the set of rules; and
based on determining that the transaction should be approved, unlocking the application at the network device associated with the sender.

12. The method of claim 8, further comprising:
receiving updated data associated with a sender including the social token used by the sender;
receiving, from the plurality of entities, updated account data associated with the plurality of accounts maintained at the entities, wherein the account data includes at least data pertaining to transactions conducted against each of the plurality of accounts;
generating an updated health score for the social token used by the sender; and
determining that the transaction should be approved based on the updated health score.

13. The method of claim 8, wherein the social token is a QR code that was assigned to the receiver by the data assessment system to replace another social token submitted by the sender.

14. The method of claim 8, wherein the operations further include using the generated health score to generate a receiver health score for the social token used by the sender for use in future transactions associated with the sender as receiver.

15. A computer-program product tangibly embodied in a non-transitory machine-readable storage medium, including instructions configured to cause one or more data processors to perform operations comprising:
receiving data associated with a sender including a social token used by the sender, wherein the data associated with the sender is used by a data assessment system to generate an account associated with the sender;
receiving from a plurality of entities, account data associated with a plurality of accounts maintained at the entities, wherein the account data includes at least data pertaining to use of the social token in transactions conducted using each of the plurality of accounts;
generating a health score for the social token used by the sender, wherein:
the health score is indicative of a level of risk for transactions that use the social token used by the sender; and
generating the health score for the social token used by the sender comprises analyzing the data pertaining to use of the social token used by the sender in transactions conducted using each of the plurality of accounts;
receiving, from the sender at an application displayed on a graphical user interface (GUI) of a network device associated with the sender, data associated with a transaction initiated by the sender using the account associated with the sender, wherein the data associated with the transaction initiated by the sender includes at least a social token used by a receiver of the transaction;
generating a health score for the social token used by the receiver, wherein generating the health score for the social token used by the receiver includes analyzing data associated with the receiver, data pertaining to use of the social token used by the receiver in one or more prior transactions, and account data received from the plurality of entities, wherein the health score for the social token comprises one or both of a score that is indicative of a level of risk for use of the social token by the sender as a payee in a transaction and a score that is indicative of a level of risk for use of the social token by the sender as a payer in a transaction;
determining a health score for the transaction using the health score for the social token used by the sender and the health score for the social token used by the receiver;
determining that the transaction should be rejected based on the health score for the transaction; and
based on determining that the transaction should be rejected and at least a portion of the received account data associated with the plurality of accounts maintained at the entities, locking the application at the network device associated with the sender.

16. The computer-program product of claim 15, wherein locking the application at the network device associated with the sender includes locking the application at the network level to cause the application at the network device to be locked.

17. The computer-program product of claim 15, wherein determining that the transaction should be rejected based on the health score for the transaction includes comparing the health score to a threshold health score.

18. The computer-program product of claim 15, wherein the operations further include:

after determining that the transaction should be declined, accessing a set of rules that indicate whether the declining of the transaction should be overridden;

determining that the transaction should be approved based on the set of rules; and based on determining that the transaction should be approved, unlocking the application at the network device associated with the sender.

19. The computer-program product of claim 15, wherein the operations further include:

receiving updated data used by a sender including the social token used by the sender;

receiving, from the plurality of entities, updated account data associated with the plurality of accounts maintained at the entities, wherein the account data includes at least data pertaining to transactions conducted against each of the plurality of accounts;

generating an updated health score for the social token used by the sender; and determining that the transaction should be approved based on the updated health score.

20. The computer-program product of claim 15, wherein the social token is a QR code that was assigned to the receiver by the data assessment system to replace another social token submitted by the sender.

* * * * *